United States Patent
Shirasaki et al.

(10) Patent No.: US 6,226,115 B1
(45) Date of Patent: *May 1, 2001

(54) OPTICAL CIRCULATOR OR SWITCH HAVING A BIREFRINGENT WEDGE POSITIONED BETWEEN FARADAY ROTATORS

(75) Inventors: Masataka Shirasaki, Winchester, MA (US); Simon Cao, San Mateo, CA (US)

(73) Assignees: Fujitsu Limited, Kawasaki (JP); Avanex Corporation, Fremont, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/163,404
(22) Filed: Sep. 30, 1998
(51) Int. Cl.[7] ............... G02F 1/09; G02B 6/00; G02B 27/28
(52) U.S. Cl. ............... 359/280; 385/11; 359/484
(58) Field of Search ............... 359/280, 281, 359/282, 283, 484; 385/11

(56) References Cited

U.S. PATENT DOCUMENTS

| | | | |
|---|---|---|---|
| 4,548,478 | 10/1985 | Shirasaki | 350/377 |
| 5,267,078 | * 11/1993 | Shiraishi et al. | 359/282 |
| 5,581,640 | * 12/1996 | Pan et al. | 385/11 |
| 5,774,264 | * 6/1998 | Konno et al. | 359/497 |
| 5,808,793 | * 9/1998 | Chang et al. | 359/484 |
| 5,844,710 | * 12/1998 | Fukushima | 359/283 |
| 5,909,310 | * 6/1999 | Li et al. | 359/484 |
| 5,912,766 | * 6/1999 | Pattie | 359/484 |
| 5,930,039 | * 7/1999 | Li et al. | 359/484 |
| 5,982,539 | * 11/1999 | Shirasaki | 359/484 |

\* cited by examiner

Primary Examiner—Georgia Epps
Assistant Examiner—David N. Spector
(74) Attorney, Agent, or Firm—Staas & Halsey LLP

(57) ABSTRACT

An optical device, such an as optical circulator or switch, which includes a birefringent tapered element, such as a birefringent wedge, positioned between first and second Faraday rotators. Light travels through the first Faraday rotator, the first birefringent tapered element and then the second Faraday rotator, in order, and along travel paths which are not parallel to each other.

33 Claims, 8 Drawing Sheets

OPTICAL CIRCULATOR OR SWITCH HAVING A BIREFRINGENT WEDGE POSITIONED BETWEEN FARADAY ROTATORS

BACKGROUND OF THE INVENTION

1. Field of the Invention

The present invention relates to an optical circulator or switch. More particularly, the present invention relates to an optical circulator or switch which includes a birefringent wedge positioned between two Faraday rotators.

2. Description of the Related Art

Optical communication systems typically use an optical circulator or switch to control light travelling through the system.

Unfortunately, conventional optical circulators and switches are typically expensive to manufacture, have a relatively high number of components and are relatively large.

SUMMARY OF THE INVENTION

Accordingly, it is an object of the present invention to provide an optical circulator or switch which is inexpensive to manufacture, has a low number of components and is relatively small in size.

Additional objects and advantages of the invention will be set forth in part in the description which follows, and, in part, will be obvious from the description, or may be learned by practice of the invention.

Objects of the present invention are achieved by providing an optical device which includes a birefringent tapered element, such as a birefringent wedge, positioned between first and second Faraday rotators, so that first and second lights having orthogonal polarizations travel through the first Faraday rotator, the birefringent tapered element and the second Faraday rotator, in order, and along travel paths which have a small angle between them, and, therefore, are not parallel to each other.

Moreover, objects of the present invention are achieved by providing an optical device including first and second birefringent wedges, and first and second Faraday rotators. The first and second birefringent wedges have crystal axes whose directions are rotated by 90° around the light traveling direction, and each have a bottom and a top and taper from the bottom to the top to form a wedge shape. The top of the first birefringent wedge is adjacent to the bottom of the second birefringent wedge, and the bottom of the first birefringent wedge is adjacent to the top of the second birefringent wedge. The first and second birefringent wedges are positioned between the first and second Faraday rotators so that light travels through the first Faraday rotator, the first birefringent wedge, the second birefringent wedge and then the second Faraday rotator, in order. Alternatively, a non-birefringent wedge, such as a glass wedge, can be used in place of either the first or second birefringent wedge.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

Reference will now be made in detail to the present preferred embodiments of the present invention, examples of which are illustrated in the accompanying drawings, wherein like reference numerals refer to like elements throughout.

Figure 1:
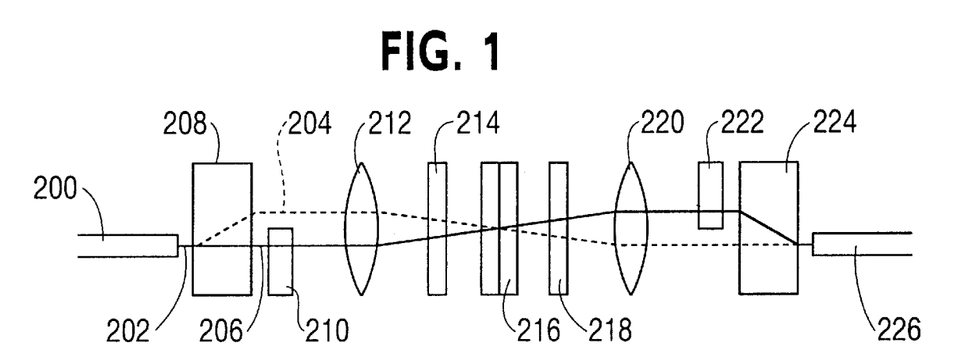
FIG. 1 is a diagram illustrating a top view of an optical device operable as an optical circulator or switch, according to an embodiment of the present invention.

FIG. 1 is a diagram illustrating a top view of an optical device operable as an optical circulator or switch, according to an embodiment of the present invention. In FIG. 1, birefringent wedges are used to deflect light beams in a different way for different polarizations.

Referring now to FIG. 1, a fiber 200 provides an input light 202 which is split into a first light 204 and a second light 206 having orthogonal polarizations by a birefringent plate 208. In order to split the orthogonal polarizations efficiently, the crystal axis of birefringent plate 208 is neither parallel nor perpendicular to the light travelling direction.

The angle between the crystal axis and the light travelling direction, for the best splitting of the orthogonal polarization, is about 45°. First light 204 has a horizontal polarization which is the extraordinary ray in birefringent plate 208, as indicated by a dashed line. Second light 206 has a vertical polarization which is the ordinary ray in birefringent plate 208, as indicated by a solid line. The light is split in the horizontal direction.

Second light 206 passes through a half-wave plate 210 that rotates polarization by 90° so that the polarization of first and second lights 204 and 206 match. Therefore, after half-wave plate 210, first and second lights 204 and 206 both have horizontal polarization.

First and second lights 204 and 206 then pass through a lens 212, which collimates the lights. The collimated first and second lights 204 and 206 have different travelling angles. First and second lights 204 and 206 pass through a first Faraday rotator 214, a birefringent wedge 216, and then a second Faraday rotator 218. First and second Faraday rotators 214 and 218 provide a 45° Faraday rotation. Birefringent wedge 216 can be replaced with any element which provides the angular splitting between two orthogonal polarizations. For example, instead of being a single birefringent wedge, such an element can be a set of two birefringent wedges, or a set of other wedges.

The plane of polarization is rotated by 45° clockwise or counterclockwise by first Faraday rotator 214, depending on a magnetic field applied to first Faraday rotator 214. Then, the first and second lights 204 and 206 are deflected either upward or downward in FIG. 1 by birefringent wedge 216, depending on the magnetic field applied to first Faraday rotator 214.

The polarization is further rotated by 45° by second Faraday rotator 218 in the same rotation direction as that of first Faraday rotator 214. Thus, first and second lights 204 and 206 both become vertically polarized after passing through second Faraday rotator 218.

As illustrated in FIG. 1, first and second lights 204 and 206 overlap and are then separated while travelling between first and second Faraday rotators 214 and 218.

From second Faraday rotator 218, first and second lights 204 and 206 pass through a lens 220. After lens 220, first light 204 passes through a half-wave plate 222 which rotates the polarization of first light 204 by 90°. Therefore, after first light 204 passes through half-wave plate 222, first light 204 is horizontally polarized, while second light 206 remains vertically polarized.

Thereafter, first and second lights 204 and 206 pass through a birefringent plate 224 so that they are combined. The combined lights are received by a fiber 226. In order to split the orthogonal polarizations efficiently, the crystal axis of birefringent plate 224 is neither parallel nor perpendicular to the light travelling direction. The angle between the crystal axis and the light travelling direction, for the best splitting of the orthogonal polarization, is about 45°.

Preferably, lenses 212 and 220 have the same focal length, and the distance between the lenses is twice the focal length.

FIG. 1 is a top view, and the top of birefringent wedge 216 is actually toward normal to the paper. Therefore, in FIG. 1, the optical paths are shown only in the horizontal plane. In the horizontal plane, the orthogonal polarizations are split and combined for the output.

Figure 2:
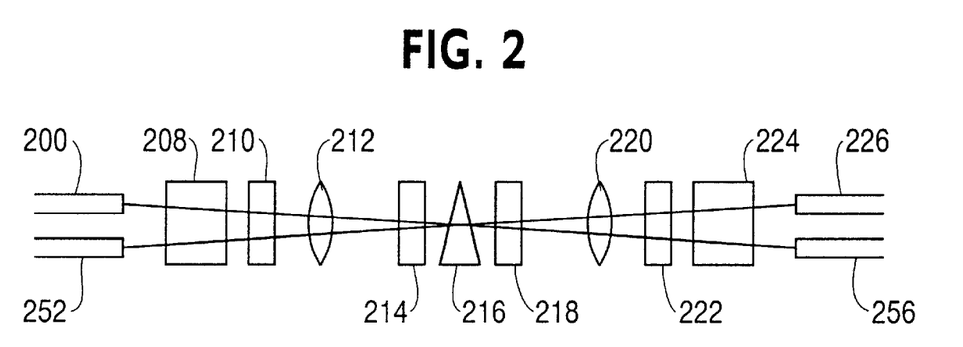
FIG. 2 is a diagram illustrating a side view of the optical device in FIG. 1, according to an embodiment of the present invention.
Figure 3A:
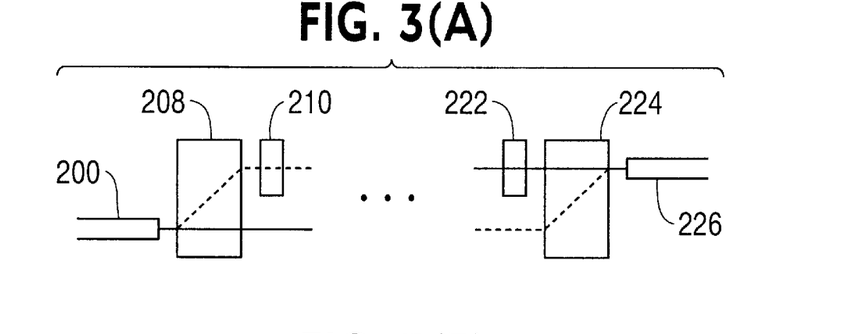
FIGS. 3(A), 3(B), 3(C) and 3(D) illustrate various arrangements of half-wave plates with respect to birefringent plates in the optical device of FIG. 1, according to embodiments of the present invention.
Figure 3B:
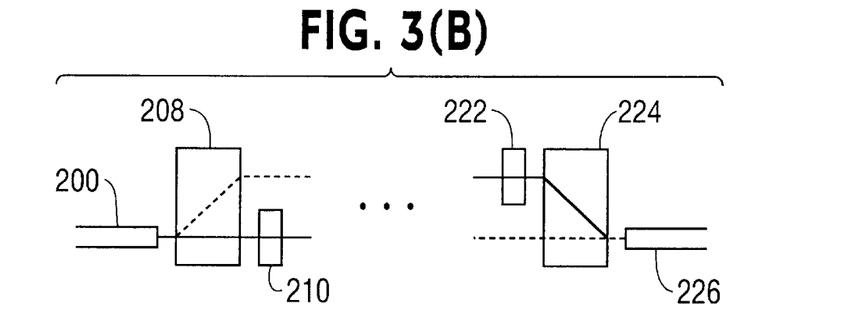
Figure 3C:
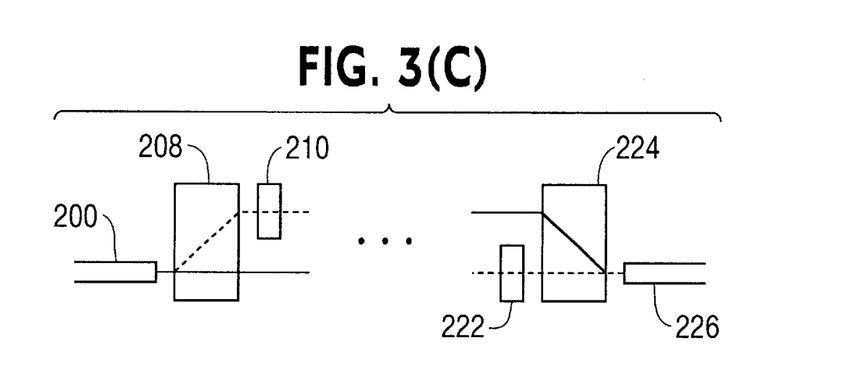
Figure 3D:
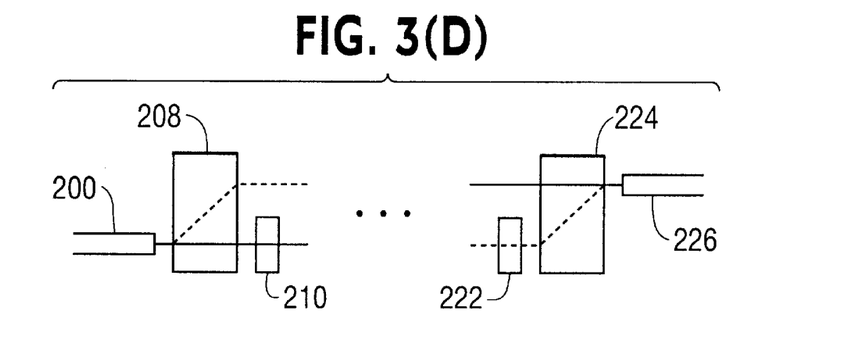

FIG. 2 is a side view of the optical device in FIG. 1, according to an embodiment of the present invention. Referring now to FIG. 2, when light enters from fiber 200, both polarization components become the same polarization after half-wave plate 210. The light then passes through birefringent wedge 216 as the ordinary ray, and couples to fiber 256. On the other hand, the light entering from fiber 256 passes through birefringent wedge 216 as the extraordinary ray for both polarization components. Then, the light is deflected in a different way, and couples to fiber 252. In a similar way, the light goes from fiber 252 to 226. Thus, the light goes from fibers 200→256→252→226, as a circulator. When the Faraday rotation is switched for both Faraday rotators, the light goes 200←256←252←226. Therefore, light from fiber 256 can go to either fiber 200 or 252, so that optical switching can be performed.

In a circulator, the Faraday rotations are fixed to either +45° and +45°, or −45° and −45°. In a switch, the magnetic field applied to the Faraday rotators are inverted simultaneously between +45°/+45° and −45°/−45°. The control of the Faraday rotators to operate the optical device as either a circulator or a switch would be understandable by a person of ordinary skill in the art.

With the optical device in FIG. 1, the light propagation directions of first and second lights 204 and 206 are not parallel to each other. Therefore, first and second Faraday rotators 214 and 218 can be made to be relatively small.

Besides that shown in FIG. 1, there are many possible positional configurations of half-wave plates 210 and 222, with respect to birefringent plates 208 and 224.

For example, FIGS. 3(A), 3(B), 3(C) and 3(D) illustrate various arrangements of half-wave plates 210 and 222 with respect to birefringent plates 208 and 224 in the optical device of FIG. 1, according to embodiments of the present invention. Generally, the configuration in FIG. 3(B) corresponds to that in FIG. 1. First and second Faraday rotators 214 and 218, birefringent wedge 216, and lenses 212 and 220 are not shown in FIGS. 3(A), 3(B), 3(C) and 3(D).

In FIG. 1, the effective distance between fiber 200 and lens 212 should preferably be approximately equal for first and second lights 204 and 206, so that lens 212 provides a highly collimated light. The effective distance is a well-known concept referring to physical distance divided by refractive distance.

Figure 4:
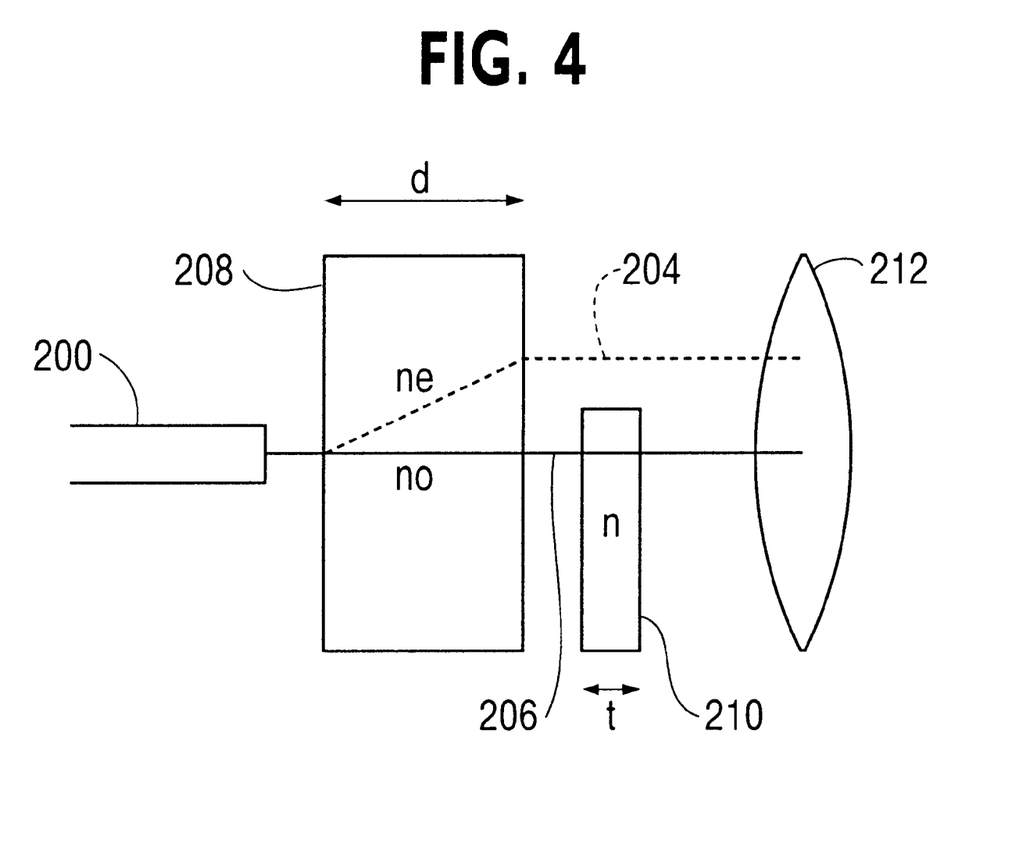
FIG. 4 is a diagram illustrating a top view of the positioning of a fiber and lens in the optical device of FIG. 1, according to an embodiment of the present invention.

For example, FIG. 4 is a diagram illustrating a top view of the positioning of fiber 200 and lens 212, according to an embodiment of the present invention. Referring now to FIG. 4, an ordinary ray and an extraordinary ray will be affected by a different refractive index in birefringent plate 208. More specifically, birefringent plate 208 has a refractive index $n_o$ for an ordinary ray, and a refractive index $n_e$ for an extraordinary ray. Therefore, first and second lights 204 and 206 will travel different effective distances through birefringent plate 208, although the physical distances travelled along the lens axis are the same. Half-wave plate 210 has a refractive index n. A typical refractive index n for a typical half-wave plate would be approximately equal to 1.5, while the refractive index of air is approximately 1.

Therefore, the following Equation 1 should be satisfied so that the effective distance between fiber 200 and lens 212 is approximately equal for first and second lights 204 and 206.

$$\left(\frac{1}{n_e} - \frac{1}{n_o}\right)d - \left(\frac{1}{n} - 1\right)t = 0 \quad \text{Equation 1}$$

Similarly, the effective distance between fiber 226 and lens 220 should preferably be approximately equal for first and second lights 204 and 206, so that lens 220 provides a highly collimated light.

Therefore, to obtain the appropriate effective distances, the thickness t of the half-wave plate can be adjusted by changing the angle between its crystal axis and the light travelling direction, and that changes the effective birefringence of the half-wave plate.

The positioning in FIG. 4 is appropriate for a birefringent plate of a positive birefringence, that is $n_e > n_o$, such as Rutile. Therefore, the term $$\left(\frac{1}{n_e} - \frac{1}{n_o}\right)$$

in Equation 1 is negative and the term $$\left(\frac{1}{n} - 1\right)$$

is also negative, and a positive number t can be a solution for Equation 1.

Figure 5:
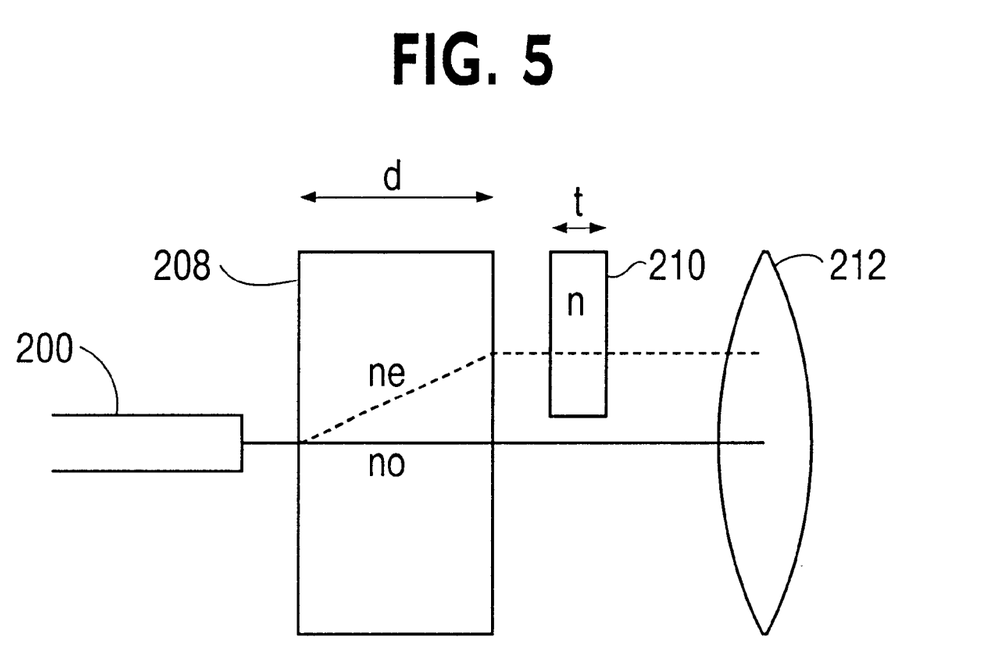
FIG. 5 is a modification of the positioning in FIG. 4, according to an embodiment of the present invention.

On the other hand, if the birefringence is negative, that is, $n_e < n_o$, such as Calcite, then the scheme should be as in FIG. 5 instead of FIG. 4.

Then the condition for effective distance matching is $$\left(\frac{1}{n_e} - \frac{1}{n_o}\right)d - \left(1 - \frac{1}{n}\right)t = 0$$

In this case, the term $$\left(\frac{1}{n_e} - \frac{1}{n_o}\right)$$

and the term $$\left(1 - \frac{1}{n}\right)$$

are positive, and a positive number t for the solution exists.

FIGS. 6(A), 6(B), 6(C) and 6(D) illustrate an alternative, which employs an additional half-wave plate 213 at any place for both lights 204 and 206 to rotate the polarization plane by 90°.

Figure 6A:
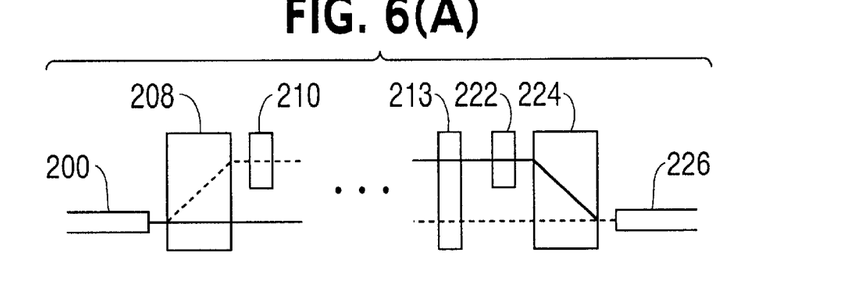
FIGS. 6(A), 6(B), 6(C) and 6(D) are diagrams illustrating the use of a half-wave plate in an optical device, according to embodiments of the present invention.
Figure 6B:
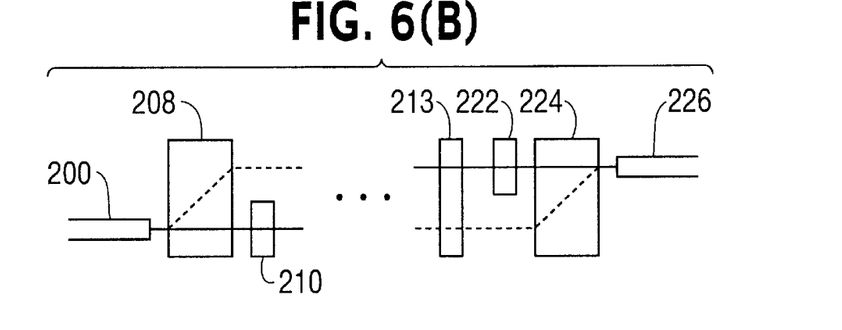
Figure 6C:
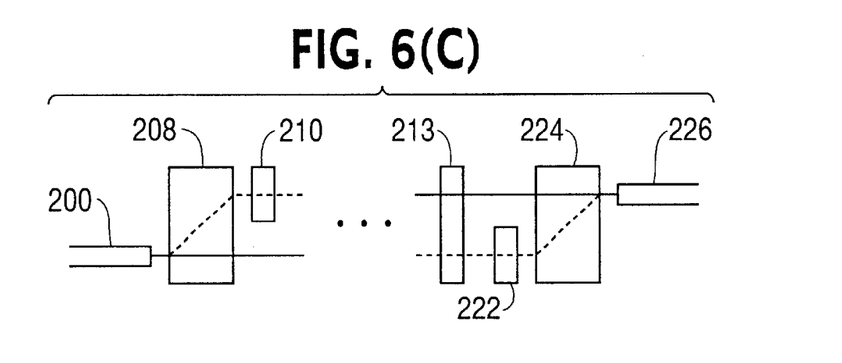
Figure 6D:
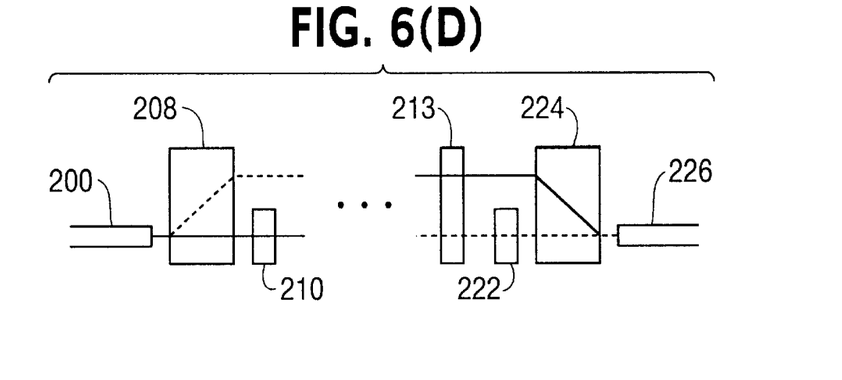

FIGS. 6(B) and 6(D) are suitable for positive birefringence, and FIGS. 6(A) and 6(C) are suitable for negative birefringence.

If the effective distance between fiber 200 and lens 212 is not equal for first and second lights 204 and 206, this error of the effective distance should be cancelled by the negative error of the effective distance between lens 220 and fiber 226. That is, the effective distance between fiber 200 and fiber 226 should be equal for first and second lights 204 and 206 to maintain an efficient fiber coupling.

In addition, the overall optical distance for first and second lights 204 and 206 should be approximately equal in order to avoid the polarization-dependent group delay, which is the difference in travelling time between two polarizations through a device. The optical distance is a well-known concept referring to the product of physical distance and refractive index.

Therefore, the following Equation 2 should be satisfied so that the optical distance between fiber 200 and lens 212 is approximately equal for first and second lights 204 and 206. Equation 2:

$$(n_e - n_o)d - (n-1)t = 0$$

Similarly, the optical distance between fiber 226 and lens 220 should be approximately equal for first and second lights 204 and 206.

The above-described conditions eliminate polarization-dependent group delay.

In practice, it is not easy to satisfy both the above-described conditions for the effective distance and the optical distance. If both Equations 1 and 2 cannot be satisfied in this manner, a glass plate may be inserted next to the half-wave plate in either the light path of the first light 204 or the second light 206, or a birefringent plate may be inserted at any place in the collimated light for both lights 204 and 206.

Referring to FIG. 1, if only one birefringent tapered element, such as birefringent wedge 216, is positioned between first and second Faraday rotators 214 and 218, it will make a difference in the optical distance between first and second lights 204 and 206, and will thereby cause polarization-dependent group delay. To reduce this problem, two birefringent tapered elements can be combined as shown in FIG. 7.

Figure 7:
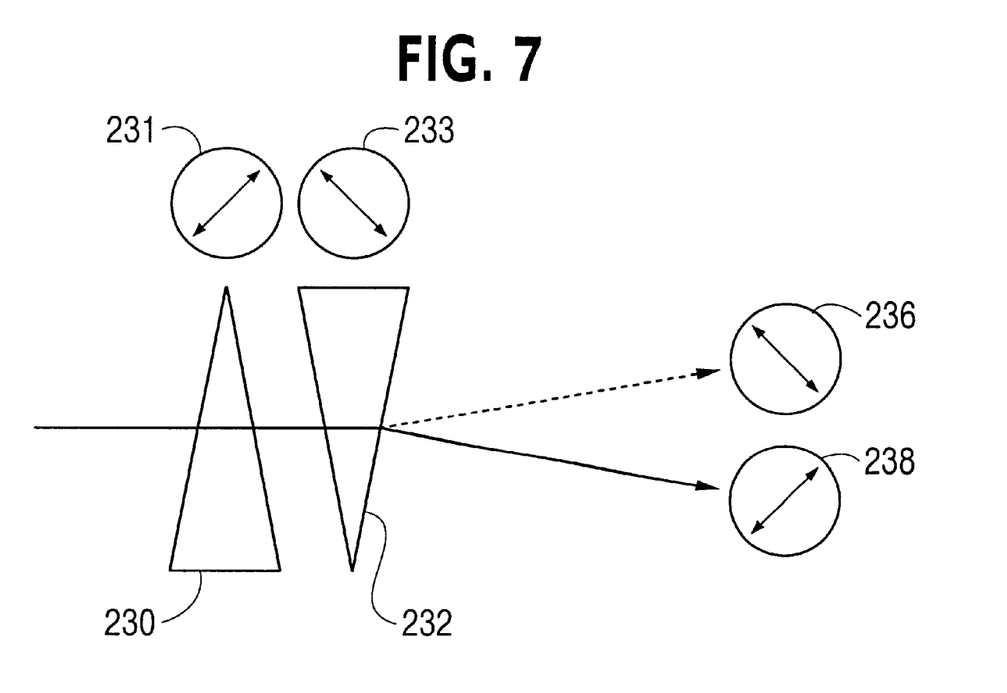
FIG. 7 is a diagram illustrating a side view of two birefringent wedges positioned to reduce polarization-dependent group delay, according to an embodiment of the present invention.

More specifically, FIG. 7 is a diagram illustrating a side view of two birefringent tapered elements, such as birefringent wedges 230 and 232, positioned to reduce polarization-dependent group delay, according to an embodiment of the present invention. Referring now to FIG. 7, the top of birefringent wedge 230 is adjacent to the bottom of birefringent wedge 232, and the bottom of birefringent wedge 230 is adjacent to the top of birefringent wedge 232. Here, the term "adjacent" indicates the relatively positioning between birefringent wedges 230 and 232 shown in FIG. 7. Even if there is material or optical elements positioned between birefringent wedges 230 and 232, the birefringent elements should still be considered to be "adjacent" as long as the top of one birefringent element corresponds to the bottom of the other birefringent element, and vise versa.

To split the light into an ordinary ray component and an extraordinary ray component, the crystal axis of the birefringent wedge should not be in the light travelling direction. For example, in order for the split lights to see the largest divergence, the crystal axis should be perpendicular to the light traveling direction. Therefore, in this case, the crystal axis has an angle which is about 90° from the light traveling direction.

In FIG. 7, the crystal axis 231 of birefringent wedge 230 is rotated by 45° around the light travelling direction from the plane of the input polarization before the Faraday rotation, and the crystal axis 233 of birefringent wedge 323 is rotated by −45° from the same plane. Therefore, birefringent wedges 230 and 232 have crystal axes rotated from each other by 90° around the travelling direction of the light. As a result, an ordinary ray in birefringent wedge 230 becomes an extraordinary ray in birefringent wedge 232, and an extraordinary ray in birefringent wedge 230 becomes an ordinary ray in birefringent wedge 232. Thus, the orthogonal polarizations are deflected in the opposite directions, and they travel the same optical distance. FIG. 7 shows the polarization directions 236 and 238 of resulting output lights.

Figure 8:
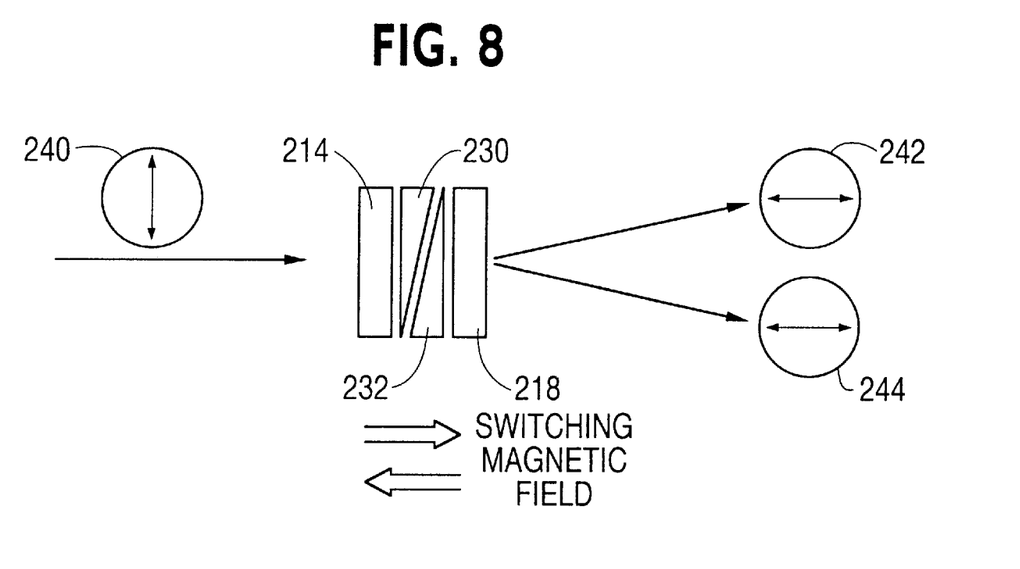
FIG. 8 is a diagram illustrating a side view of the birefringent wedges in FIG. 7, as used in the optical device in FIG. 1, according to an embodiment of the present invention.

FIG. 8 is a diagram illustrating a side view of birefringent wedges 230 and 232 as used in the optical device in FIG. 1, according to an embodiment of the present invention. Referring now to FIG. 8, birefringent wedges 230 and 232 are positioned between first and second Faraday rotators 214 and 218. Thus, birefringent wedges 230 and 232, and first and second Faraday rotators 214 and 218, can be close to each other. For example, birefringent wedges 230 and 232, and first and second Faraday rotators 214 and 218, can be sufficiently close together so that a physical distance which light travels through these elements is less than or equal to 0.5 mm. Further, since first and second Faraday rotators 214 and 218 are very close, a magnetic field can easily be switched simultaneously by electric current for both first and second Faraday rotators 214 and 218.

FIG. 8 also shows an example of the polarizations direction 240 of the light received by first Faraday rotator 214, and the polarization directions 242 and 244 of the lights output from second Faraday rotator 218.

Birefringent tapered elements positioned between Faraday rotators, such as birefringent wedges 216, 230 and 232, and birefringent plates 208 and 224, can be made of, for example, either titanium dioxide, lithium niobate or calcite.

In an optical circulator, the light in polarization direction 242 goes to the light in polarization direction 240, and the light in polarization direction 240 goes to the light in polarization direction 244, with the magnetic field in one of two directions. In an optical switch, by switching the direction of the magnetic field, the light in polarization direction 240 goes to either the light in polarization directions 242 or 244, dependent on the magnetic field.

The optical device in FIG. 1 can be used as either an optical circulator or an optical switch, as would be understandable by a person of skill in the art. Thus, light can travel in either direction through the optical device.

In the above embodiments of the present invention, when used as an optical switch, a Faraday rotator can be substituted with any other suitable element, such as an electro-optic crystal or liquid crystal, which rotates the input polarization.

In the above embodiments of the present invention, Faraday rotators are described as providing a 45° Faraday rotation. However, the present invention is not intended to be limited to use with Faraday rotators which provide a specific amount of Faraday rotation. Therefore, embodiments of the present invention are applicable to devices using Faraday rotators providing more than, or less than, 45° rotation.

The Faraday rotators in the above embodiments of the present invention can be controlled by a magnetic field which is applied simultaneously to both of the Faraday rotators, where this magnetic field is switched by an electric current. Such control of Faraday rotators is known by persons of skill in the art.

In the above embodiments of the present invention, an optical device is described as using a birefringent element, such as birefringent wedges 216, 230 and 232, positioned between Faraday rotators. However, the present invention is not intended to be limited to use with a "wedge" shaped birefringent element. Instead, the birefringent element should simply be tapered to provide the required effect, and need not be a "wedge". Such a birefringent element could simply be referred to as a "birefringent tapered element". Thus, for example, a birefringent tapered element can taper from the bottom to the top, but not be considered to form a "wedge" shape.

Further, in the above embodiments of the present invention, an optical element, such as a birefringent tapered element, is positioned between two Faraday rotators. However, the optical element is not intended to be limited to a birefringent tapered element. Instead, the optical element can be any optical element having optical characteristics so that, when the optical element receives a collimated light having first and second polarizations orthogonal to each other, the optical element splits the collimated light into first and second rays corresponding, respectively, to the first and second polarizations, where the first and second rays travel in different directions.

Further, in the above embodiments of the present invention, an optical device is described as using a separating device, such as a birefringent plate, to separate light. For example, in FIG. 1, birefringent plate 208 separates input light into two separate lights. However, a separating device is not intended to be limited to a birefringent plate. For example, the separating device can be a birefringent element which is not shaped as a "plate", and can be many other shapes. In addition, a separating device is not intended to be limited to a birefringent element. A separating element can be, for example, a polarizing prism.

Further, in the above embodiments of the present invention, an optical device is described as using a combining device, such as a birefringent plate, to combine light. For example, in FIG. 1, birefringent plate 224 combines light. However, a combining device is not intended to be limited to a birefringent plate. For example, the combining device can be a birefringent element which is not shaped as a "plate", and can be many other shapes. In addition, a combining device is not intended to be limited to a birefringent element. A combining element can be, for example, a polarizing prism.

In the above embodiments of the present invention, an optical device is described as using a half-wave element, such as a half-wave plate, to rotate the polarization of light. Such a half-wave element preferably has a "plate" shape. However, the half-wave element is not intended to be limited to a "plate" shape.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An optical device comprising:

a separating device receiving an input light and separating the input light into first and second lights having orthogonal polarizations;

a first lens which collimates the first and second lights, the collimated first and second lights travelling in different directions;

first and second Faraday rotators; and a first birefringent tapered element positioned between the first and second Faraday rotators so that the collimated first and second lights travel through the first Faraday rotator, the first birefringent tapered element and then the second Faraday rotator, in order.

2. An optical device as in claim 1, further comprising:

a second birefringent tapered element positioned between the first and second Faraday rotators, wherein
the collimated first and second lights travel through the first Faraday rotator, the first birefringent tapered element, the second birefringent tapered element and then the second Faraday rotator, in order,
the first and second birefringent tapered elements each have a bottom and a top, and taper from the bottom to the top, and
the top of the first birefringent tapered element is adjacent to the bottom of the second birefringent tapered element, and the bottom of the first birefringent tapered element is adjacent to the top of the second birefringent tapered element.

3. An optical device as in claim 2, wherein the first and second birefringent tapered elements each have a crystal axis rotated from each other by 90°.

4. An optical device as in claim 1, wherein the first and second lights overlap when travelling between the first and second Faraday rotators, the optical device further comprising:

a first half-wave element rotating the polarization of the second light by 90° before the first and second lights overlap.

5. An optical device as in claim 4, wherein the first half-wave element is positioned between the first lens and the separating device.

6. An optical device as in claim 5, wherein the first and second lights overlap and then separate when travelling between the first and second Faraday rotators, the optical device further comprising:

a second half-wave element rotating the polarization of the first light by 90° after the first and second lights are separated; and a second lens focusing the first and second lights after travelling through the second Faraday rotator.

7. An optical device as in claim 6, further comprising:
a combining device combining the first and second lights after being focused by the second lens and the polarization of the first light is rotated by the second half-wave element.

8. An optical device as in claim 1, wherein the first and second Faraday rotators each provide a 45° Faraday rotation.

9. An optical device as in claim 2, wherein the first and second Faraday rotators each provide a 45° Faraday rotation.

10. An optical device as in claim 1, wherein
the first birefringent tapered element has a deflection direction in accordance with the polarization of the traveling light, and
the optical device further comprises first and second optical fibers displaced vertically from each other and positioned in accordance with the deflection direction of the first birefringent tapered element.

11. An optical device as in claim 1, wherein the first birefringent tapered element is made of one of the group consisting of titanium dioxide, lithium niobate and calcite.

12. An optical device as in claim 7, wherein at least one of the group consisting of the separating device and the combining device is made of one of the group consisting of titanium dioxide, lithium niobate and calcite.

13. An optical device as in claim 2, wherein a magnetic field is applied simultaneously to both the first and second Faraday rotators and is switched by an electric current.

14. An optical device as in claim 6, wherein the first and second lenses have the same focal length, and the distance between the first and second lenses is twice the focal length.

15. An optical device as in claim 1, wherein the first birefringent tapered element is wedge shaped.

16. An optical device as in claim 2, wherein the first and second birefringent tapered elements are wedge shaped.

17. An optical device comprising:
first and second Faraday rotators;
a first birefringent tapered element positioned between the first and second Faraday rotators, wherein first and second lights having orthogonal polarizations travel through the first Faraday rotator, the first birefringent tapered element and the second Faraday rotator, in order, and along travel paths which are not parallel to each other.

18. An optical device as in claim 17, wherein the first and second lights overlap when travelling between the first and second Faraday rotators, the optical device further comprising:
a first half-wave element rotating the polarization of the second light by 90° before the first and second lights overlap.

19. An optical device as in claim 18, further comprising:
a first lens collimating the first light and the second light after the polarization is rotated by the first half-wave element so that the first Faraday rotator receives the first and second lights as collimated light.

20. An optical device as in claim 19, further comprising:
a second lens focusing the first and second lights into a fiber after travelling through the second Faraday rotator.

21. An optical device as in claim 20, wherein the first and second lights overlap and then separate when travelling between the first and second Faraday rotators, the optical device further comprising:
a second half-wave element rotating the polarization of the first light by 90° after the first and second lights are separated.

22. An optical device as in claim 18, wherein the first half-wave element has a principal axis at a 45° angle from a polarization plane of the first and second lights, and the first and second lights have the same polarization after the polarization of the second light is rotated by the first half-wave element.

23. An optical device as in claim 19, further comprising:
a fiber providing input light; and
a separating device separating the input light to form the first and second lights, the first light travelling from the separating device to the first lens and the second light travelling from the separating device to the first half-wave element, the first half-wave element having crystal axes oriented so that an effective distance between the fiber and the first lens is substantially equal for the first and second lights.

24. An optical device as in claim 19, further comprising:
a fiber providing input light; and
a separating device separating the input light to form the first and second lights, the first light travelling from the separating device to the first lens and the second light travelling from the separating device to the first half-wave element, the first half-wave element having crystal axes oriented so that an optical distance between the fiber and the first lens is substantially equal for the first and second lights.

25. An optical device comprising:
first and second Faraday rotators; and
a first and second birefringent wedges, each having a bottom and a top and tapering from the bottom to the top to form a wedge shape, the top of the first birefringent wedge being adjacent to the bottom of the second birefringent wedge, and the bottom of the first birefringent wedge being adjacent to the top of the second birefringent wedge, the first and second birefringent wedges positioned between the first and second Faraday rotators so that light travels through the first Faraday rotator, the first birefringent wedge, the second birefringent wedge and then the second Faraday rotator, in order.

26. An optical device as in claim 25, wherein the first and second birefringent wedges have crystal axes rotated 90° from each other.

27. An optical device comprising:
a first optical element having optical characteristics so that, when the optical element receives a collimated light having first and second polarizations orthogonal to each other, the optical element splits the collimated light into first and second rays corresponding, respectively, to the first and second polarizations, the first and second rays travelling in different directions; and
first and second Faraday rotators with the optical element between the first and second Faraday rotators, wherein first and second lights having orthogonal polarizations travel through the first Faraday rotator, the first optical element and the second Faraday rotator, in order, and along travel paths which are not parallel to each other.

28. An optical device as in claim 27, further comprising:
a second optical element having optical characteristics so that, when the second optical element receives a collimated light having first and second polarizations orthogonal to each other, the second optical element splits the collimated light into first and second rays corresponding, respectively, to the first and second polarizations, the first and second rays travelling in different directions, the second optical element positioned between the first and second Faraday rotators so that the first and second lights travel through the first Faraday rotator, the first optical element, the second optical element and then the second Faraday rotator, in order.

29. An optical device as in claim 28, wherein the first and second optical elements each have a bottom and a top, and taper from the bottom to the top, the top of the first optical element being adjacent to the bottom of the second optical element, and the bottom of the first optical element being adjacent to the top of the second optical element.

30. An optical device as in claim 29, wherein the first and second optical elements are birefringent wedges.

31. An optical device as in claim 27, wherein the first optical element is a birefringent wedge.

32. An optical device as in claim 27, further comprising:

a fiber providing input light;

a separating device separating the input light to form the first and second lights;

a half-wave element rotating the polarization of the second light by 90°; and a lens collimating the first light and the second light after the polarization is rotated by the half-wave element so that the first Faraday rotator receives the first and second lights as collimated light, the half-wave element having crystal axes oriented so that an effective distance between the fiber and the first lens is substantially equal for the first and second lights.

33. An optical device as in claim 27, further comprising:

a fiber providing input light;

a separating device separating the input light to form the first and second lights;

a half-wave element rotating the polarization of the second light by 90°; and a lens collimating the first light and the second light after the polarization is rotated by the half-wave element so that the first Faraday rotator receives the first and second lights as collimated light, the half-wave element having crystal axes oriented so that an optical distance between the fiber and the first lens is substantially equal for the first and second lights.

* * * * *